United States Patent [19]

Gotoh

[11] Patent Number: 5,216,038

[45] Date of Patent: Jun. 1, 1993

[54] PROCESS FOR PRODUCING PLASTIC FOAM

[75] Inventor: Shiroh Gotoh, Mie, Japan

[73] Assignee: Mitsubishi Petrochemical Co., Ltd., Tokyo, Japan

[21] Appl. No.: 781,370

[22] Filed: Oct. 23, 1991

[30] Foreign Application Priority Data

Nov. 1, 1990 [JP] Japan ................................ 2-295838

[51] Int. Cl.$^5$ ................................................ C08J 9/06
[52] U.S. Cl. ........................................ 521/89; 521/150; 521/915; 525/240
[58] Field of Search ............. 521/150, 89, 915; 525/240

[56] References Cited

U.S. PATENT DOCUMENTS 4,680,318 7/1987 Fujii et al. ............................ 521/95
4,987,193 1/1991 Gotoh ................................. 525/313

FOREIGN PATENT DOCUMENTS 0040934 12/1981 European Pat. Off. .
2012282 7/1979 United Kingdom .

*Primary Examiner*—Morton Foelak
*Attorney, Agent, or Firm*—Oblon, Spivak, McClelland, Maier & Neustadt

[57] ABSTRACT

A process for producing a foam comprising subjecting a foaming composition to foaming conditions, said foaming composition comprising (A) from 1 to 99% by weight, based on the total weight of (A) and (B), of a random copolymer comprising units derived from propylene, from 0.1 to 15 mol % of units derived from a non-conjugated diene represented by formula (I):

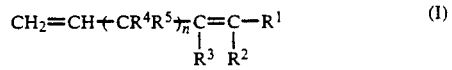

wherein $R^1$, $R^2$, $R^3$, $R^4$, and $R^5$ each independently represents a hydrogen atom or an alkyl group having from 1 to 8 carbon atoms; and n represents a number of from 2 to 10, and, if desired, up to 4 mol % of units derived from ethylene, said random copolymer having a degree of crystallinity of at least 20% as measured by X-ray diffractometry, a melt flow rate of from 0.01 to 200 g/10 min as measured according to ASTM D1238-1986, and an elastic modulus of from 1,000 to 15,000 kg/cm$^2$ as measured according to JIS K-7203, and (B) from 99 to 1% by weight, based on the total weight of (A) and (B), of a homopolymer of an α-olefin having from 3 to 12 carbon atoms or a copolymer mainly comprising said α-olefin, wherein the melting point of the minor resin component (A) or (B) is less than 15° C. higher than that of the major resin component (A) or (B), and the ratio of the melt flow rate of resin component (A) to that of (B) is between 0.02 and 50, utilizes a foaming composition having a low melt viscosity and provides a uniform foam having a uniform cell size and a high foaming rate.

13 Claims, No Drawings

PROCESS FOR PRODUCING PLASTIC FOAM

BACKGROUND OF THE INVENTION

1. Field of the Invention

The present invention relates to a process for producing plastic foam made of a foaming resin composition containing a propylene-based unsaturated copolymer resin obtained by random copolymerization of propylene, ethylene, and a specific non-conjugated diene, and the foams therefrom.

2. Discussion of the Background

Polypropylene foam has been used in a wide variety fields because of its heat insulating properties, cushioning properties, lightness, etc.

Generally employed techniques for obtaining a foam of a high expansion-rate include a process utilizing crosslinking to improve foam stability at the time of foaming and a process in which a resin containing a large quantity of a physical foaming agent (pneumatogen) is made to foam before the pneumatogen is volatilized.

Olefin resins, *inter alia,* propylene resins are excellent in moldability, transparency, heat resistance, electrical insulating properties, water resistance, chemical resistance, mechanical strength, and the like and are therefore used in a many fields. However, satisfactory foams cannot be obtained from α-olefin resins, including propylene resins. While crosslinking is desired for producing foams from this kind of resins, such resins are not easily crosslinker by radical crosslinking with peroxides or radiation because cleavage of the main chain due to radicals generally precedes crosslinking, resulting in a failure to obtain a highly expanded foam. A possible countermeasure against this problem is the incorporation of various crosslinking aids comprising a polyfunctional compound, but such an approach is attended by the non-uniformity of crosslinking, the bleeding of low-molecular weight substances, the deterioration of weather resistance, and the deterioration of various physical properties.

In an attempt to overcome the problems associated with the conventional techniques, the inventors previously proposed crosslinkable propylene resins as disclosed in JP-B-64-2139 (the term "JP-B" as used herein means an "examined Japanese patent publication"), JP-A-58-21093 (the term "JP-A" as used herein means an "unexamined Japanese patent publication"), and Japanese Patent Appln. No. Hei-2-134476. The proposed crosslinkable propylene resins have their own utility but are still unsatisfactory as foaming materials. That is, when the resin is kneaded with a chemical foaming agent, the melt viscosity increases causing shearing heat generation, and the resin temperature rises above the decomposition point of the foaming agent. It is likely, as a result, that gas is evolved due to the decomposition of the foaming agent during kneading, thus entrapping gas bubbles of irregular size in the preforms. This being the case, the finally obtained foamed article contains large voids or has a non-uniform cell size, or fails to have a high expansion-rate. Where a physical foaming process is adopted, similar problems are sometimes encountered probably due to the nonuniformity in melt viscosity.

JP-A-58-210930 discloses a process for producing a foam from a composition comprising an α-olefin-1,4-diene random copolymer and a thermoplastic resin exemplified by polypropylene. The process is characterized as a technique for producing a crosslinked foam from a radical-crosslinkable propylene resin. However, the crosslinking efficiency is not always high, and radical crosslinking is unavoidably accompanied by cleavage of the polymer main chain. Moreover, due consideration is not given to the difference in melting points of the α-olefin-1,4-diene random copolymer and polypropylene to be blended. On account of these problems, the closed cell size of the resulting foam is not always uniform, and the physical properties of the foam, such as tensile characteristics, still need further improvements.

Further, the process for random copolymerizing propylene, ethylene, and a 1,4-diene has been proposed in JP-A-62-115007 and JP-A-62-115008 (these applications correspond to U.S. Pat. No. 4,680,318), but this technique similarly requires improvements in the crosslinking efficiency and the physical properties of the resulting foam.

In addition, U.S. Pat. No. 4,987,193 discloses a process for producing unsaturated copolymers, including copolymers of propylene and 6-methyl-1,6-octadiene and/or 7-methyl-1,6-octadiene. This reference also contains a general disclosure of compositions which contain such copolymers and a wide range of other polymers, including thermoplastic resins, natural rubbers, and synthetic rubbers. However, this reference contains no suggestion of the criticality of the relationship between the relative properties of the components in a two component foaming composition and the properties of the resulting foam. Thus, this reference does not contain any suggestion of the effect of obtaining foams having improved foam rates and having more uniform cell sizes by controlling the relationship between the melt flow rates and melting points of the polymers in a foaming composition.

Thus, there remains a need for a process for producing plastic foams and the foams produced thereby which are free of the above-described drawbacks.

SUMMARY OF THE INVENTION

Accordingly, one object of the present invention is to provide a process for producing a foam having a uniform cell size and a high expansion-rate.

It is another object of the present invention to provide plastic foams, which have a uniform cell size and a high expansion-rate.

These and other objects, which will become apparent during the following detailed description, have been achieved by the inventors, discovery that a process for producing a foam comprising subjecting a foaming composition to foaming conditions, said foaming composition comprising (A) from 1 to 99% by weight, based on the total weight of (A) and (B), of a random copolymer comprising units derived from propylene, from 0.1 to 15 mol % of units derived from a non-conjugated diene represented by formula (I):

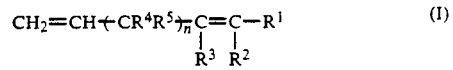

wherein $R^1$, $R^2$, $R^3$, $R^4$, and $R^5$ each independently represents a hydrogen atom or an alkyl group having from 1 to 8 carbon atoms; and n represents a number of from 2 to 10, and 0 to 4 mol % of units derived from ethylene, said random copolymer having a degree of crystallinity of at least 20% as measured by X-ray diffractometry, a melt flow rate of from 0.01 to 200 g/10 min as measured according to ASTM D1238-1986, and an elastic modulus of from 1,000 to 15,000 kg/cm$^2$ as measured according to ASTM D790M-86, and (B) from 99 to 1% by weight, based on the total weight of (A) and (B), of a homopolymer of an α-olefin having from 3 to 12 carbon atoms or a copolymer mainly comprising said α-olefin, wherein the melting point of the minor resin component (A) or (B) is less than 15° C. higher than that of the major resin component (A) or (B), and the ratio of the melt flow rate of resin component (A) to that of (B) is between 0.02 and 50, yields foams having excellent properties.

The foaming compositions used in the present invention have low melt viscosities and provide uniform foams having uniform cell sizes and high expansion rates. When the foaming composition is crosslinked, there is obtained a homogeneous foam in which the non-conjugated diene-containing random copolymer resin and the α-olefin copolymer resin are partially co-crosslinked.

Further, the present invention allows modifications based on the unsaturated bonds in the side chains of the random copolymer. For example, a modification may be introduced while leaving part of the unsaturated bonds intact, followed by crosslinking, or crosslinking may be followed by a modification based on the unsaturated bonds remaining on the surface, thereby endowing the foam with characteristics primarily ascribed to a polar group, such as adhesiveness, coating properties, and printability, that are not essentially possessed by conventional polyolefin foams. It should be noted, however, that crosslinking is often accompanied by introduction of a functional group due to oxidation, etc. of the unsaturated bond so that these characteristics may be imparted without resorting to any extra modification.

The foams produced by the present invention are suitable for use, e.g., as automobile parts, wire coatings, appliance parts, and pipe cover of hot water.

DETAILED DESCRIPTION OF THE PREFERRED EMBODIMENTS

Resin (A) is a random copolymer comprising propylene, a non-conjugated diene of formula (I) and, if desired, ethylene. Resin (A) is prepared by random copolymerization in the presence of a known Ziegler-Natta catalyst by use of a known process and a known apparatus generally employed for production of α-olefin polymers.

Examples of suitable non-conjugated dienes of formula (I) include 1,5-dienes, e.g., 1,5-heptadiene, 5-methyl-1,5-heptadiene, 6-methyl-1,5-heptadiene, 1,5-octadiene, 5-methyl1,5-octadiene, and 6-methyl-1,5-octadiene; 1,6-dienes, e.g., 1,6-octadiene, 6-methyl-1,6-octadiene, 7-methyl-1,6-octadiene, 7-ethyl-1,6-octadiene, 1,6-nonadiene, 7-methyl-1,6-nonadiene, and 4-methyl-1,6-nonadiene; 1,7-dienes, e.g., 1,7-nonadiene and 8-methyl-1,7-nonadiene; and others, e.g., 1,11-dodecadiene and 1,13-tetradecadiene. For technical convenience in the copolymerization, branched non-conjugated dienes, e.g., 6-methyl-1,5-heptadiene, 6-methyl-1,5-octadiene, 6-methyl-1,6-octadiene, 7-methyl-1,6-octadiene, 7-ethyl-1,6-octadiene, and 8-methyl-1,7-nonadiene are preferred, with 7-methyl-1,6-octadiene being particularly preferred. These non-conjugated dienes may be used either individually or in combination of two or more thereof.

The propylene content in resin (A) is from 81 to 99.9 mol %.

The non-conjugated diene content in resin (A) is from 0.1 to 15 mol %, preferably from 0.2 to 10 mol %, and more preferably from 0.5 to 6 mol %. If it is less than 0.1 mol %, the unsaturated bond content in resin (A) is too low to exert a sufficient crosslinking effect. If it exceeds 15 mol %, the productivity of the random copolymer becomes prior, and the resulting random copolymer becomes tacky or has insufficient crystallinity for retaining a resinous state.

Ethylene is an optional component which may be used, if desired, for the purpose of improving certain characteristics demanded of the copolymer, such as moldability, softness, or for melting point adjustment. The ethylene content in resin (A) is appropriately determined according to the characteristics of resin (B) or other factors. It is usually in the range of from 0 to 4 mol %, preferably from 0 to 3 mol %, and more preferably from 0 to 2 mol %. At too high an ethylene content, the random copolymer has too low a crystallinity, failing to maintain resinous properties.

Resin (A) has a degree of crystallinity of at least 20% as measured by X-ray diffractometry. Resin (A) has a degree of crystallinity of up to 60%, preferably 25 to 50%. With respect to X-ray diffractometry of, e.g., propylene polymer resins, the method of G. Natta, et al., *Rend. Accad. Naz. Lincei.*, Vol. 22, No. 8, p. 11 (1957) can be referred to. In particular, propylene-based random copolymer resins preferably have a degree of crystallinity of 25% or higher.

Resin (A) has a melt flow rate of from 0.01 to 200 g/10 min, preferably from 0.1 to 100 g/10min, and more preferably from 0.3 to 30 g/10 min, as measured according to ASTM D1238-1986. It is necessary to determine the melt flow rate of resin (A) to satisfy the specific relationship to that of resin (B) as hereinafter described in detail.

Resin (A) suitably has a melting point, measured as the peak temperature measured with a differential scanning calorimeter (DSC), between 110° and 165° C., preferably between 115° and 155° C., and more preferably between 120° and 150° C. Resin (A) having a melting point of less than 110° C. not only fails to manifest heat resistant properties characteristic of α-olefin resins but also becomes rubbery.

The random copolymer (resin (A)) to be used in the present invention exhibits properties as a resin, having a flexural modulus (ASTM D790M-86) of from 1,000 to 15,000 kg/cm$^2$, preferably from 1,000 to 12,000 kg/cm$^2$, and more preferably from 1,500 to 10,000 kg/cm$^2$. If the flexural modulus is less than 1,000 kg/cm$^2$, good heat resistance cannot be achieved.

The random copolymerization of the above-mentioned monomers is usually carried out in the presence of a Ziegler type stereospecific catalyst formed from a known highly active reduced titanium trichloride composition and an organoaluminum compound, or a Ziegler type stereospecific catalyst formed from a solid titanium catalyst component containing essentially titanium, magnesium, halogen, and an electron donor and an organoaluminum compound. The latter catalyst is preferred for reducing the formation of soluble polymers as by-products.

The monomer ratio in the random copolymerization system does not need to be constant throughout the progress of copolymerization. The monomers may be fed at a given mixing ratio, or the mixing ratio may be changed with time. Further taking the copolymerization ratio into consideration, any of the monomers, particularly the non-conjugated diene(s) may be added in divided portions.

Any mode of polymerization can be adopted as long as the catalyst and each monomer are efficiently contacted with each other. Suitable polymerization modes include slurry polymerization in the presence of an inert solvent, slurry polymerization using the α-olefin and non-conjugated diene(s) as a solvent in the substantial absence of an inert solvent, and gaseous phase polymerization in which monomers are kept gaseous without substantially using any liquid solvent.

While the polymerization conditions are subject to variation according to the process employed, a suitable temperature is from 30° to 100° C., preferably from 40° to 90° C., and more preferably from 50° to 80° C., and a suitable pressure is from 0 to 45 kg/cm$^2$G, preferably from 1 to 40 kg/cm$^2$G, and more preferably from 2 to 36 kg/cm$^2$G.

Various known techniques for molecular weight control can be utilized. For practice, molecular weight control by adding hydrogen is the most preferred.

If desired, a small amount of an α-olefin may be homopolymerized before performing random copolymerization so as to improve productivity. While not limiting, propylene is preferably used to this effect.

Resin (B) which can be used in the present invention is a homopolymer of an α-olefin having from 3 to 12 carbon atoms, e.g., propylene, 1-butene, 4-methyl-1-pentene, 3-methyl-1-butene, 1-hexene, and 1-octene, or a copolymer mainly comprising such an α-olefin. The term "mainly comprising" means that the content of the α-olefin having from 3 to 12 carbon atoms in the monomer mixture used to prepare the copolymer is at least 50% by weight, preferably at least 80% by weight.

Suitable comonomers include styrene, ethylene, $C_{1-4}$-alkyl (meth)acrylate, (meth)acrylic acid, 1,3-butadiene, and so on. Among these, styrene, and ethylene are preferred.

From the standpoint of mechanical properties and cost, resin (B) is preferably selected from homo- or copolymers comprising propylene or 1-butene, and particularly propylene polymers.

The copolymer (resin (B)) includes not only those comprising α-olefins having 3 to 12 carbon atoms but those comprising such an α-olefin(s) and other copolymerizable monomer(s), e.g., ethylene. Modified α-olefin polymers obtained by grafting with an unsaturated carboxylic acid derivative, such as (meth)acrylic acid and $C_{1-4}$-alkyl (meth)acrylates, or a silane compound having an olefinic double bond, such as vinyltrimethoxysilane, maleic acid anhydride, and glycidyl methacrylate, or by oxidation can also be used as resin (B).

The foaming composition which can be used in the present invention essentially comprises resins (A) and (B). The ratio of resins (A) and (B) is an important factor decisive in performance properties of the resulting foam and should therefore be decided with due consideration of the characteristics of each resin component and the characteristics of the desired foam. For example, where the physical properties or high crosslinkability of resin (A) are to be taken advantage of for achieving delicate improvements in physical properties or reduction of cost, it is preferable to use resin (A) as the major component while using resin (B) as the minor component. Where physical properties of resin (B) are to be taken advantage of endowing a foam with crosslinkability or surface characteristics (e.g., printability and adhesiveness), it is preferable to use resin (B) as the major component while using resin (A) as the minor component. For letting each resin component fully exert their characteristics, a weight ratio of resin (A) to resin (B) ranges from 1:99 to 99:1, preferably from 5:95 to 95:5, and more preferably from 10:90 to 90:10.

The diene content of resin composition is from 0.1 to 14.8 mol %, preferably from 0.2 to 5.4 mol %.

The foaming composition of the present invention must also satisfy a specific relationship between resins (A) and (B) with respect to melting point and melt flow rate. That is, of resins (A) and (B), the resin used in a minor proportion (less than 50% by weight) must have a melting point less than 15° C. higher than that of the other resin used in a major proportion (greater than 50% by weight), preferably less than 10° C. higher. If the melting point of the minor resin is not less than 15° C. higher than that of the major resin, the two resins are difficult to mix uniformly when kneaded with a relatively low shear, resulting in uneven foaming or, when they are kneaded with a chemical foaming agent, the mixed resin temperature increases above the decomposition temperature of the foaming agent due to shearing heat generation, failing to obtain a satisfactory foam.

Further, the ratio of the melt flow rate (ASTM D1238-1986) of resin (A) to that of resin (B):

$$\frac{\text{melt flow rate } (A)}{\text{melt flow rate } (B)}$$

should fall within the range of from 0.02 to 50, preferably from 0.04 to 25, and more preferably from 0.1 to 10. When this ratio is outside of this range, it is difficult to obtain a satisfactory foam.

If desired, the foaming composition may further contain up to 30% by weight, preferably 1 to 20% by weight, based on the total weight of composition, of other additional components as far as the effects of the present invention may not be impaired.

Such additional components include thermoplastic resins other than resins (A) and (B); rubbers; polyethylene; phenol type, sulfur type, phosphorus type, or amine type stabilizers including stabilizers against radiation deterioration, antioxidants, ultraviolet absorbents, and stabilizers against thermal deterioration; inorganic fillers, e.g., silica, mica, talc, calcium carbonate, carbon black, glass fiber, glass microspheres, carbon fiber, gypsum, clay, aluminum hydroxide, magnesium hydroxide, magnesium oxide, and titanium oxide; colorants or pigments; flame retardants; surface active agents; crosslinking inhibitors or retardants; and crosslinking aids.

In the present invention, a foam is produced by subjecting the above-mentioned foaming composition to foaming conditions. The term "subject to foaming conditions" as used herein means not only causing the composition to foam by the action of a foaming agent but also, if desired, foaming with crosslinking.

For production of a foam from the foaming composition, any conventional technique typically applied to ethylene polymer resins, such as extrusion foam-molding, press foam-molding, and bead foam-molding, can be used.

While the foaming composition can be foamed without crosslinking, it is preferable to crosslink the composition for controlling the viscosity of the composition on foaming. In this connection, the foaming composition of the present invention is characterized by its excellent crosslinkability.

Crosslinking of the composition can be effected by radical crosslinking using a radical generator, crosslinking using sulfur or a sulfur compound, radiation crosslinking, so-called resin crosslinking, and so-called quinoid crosslinking. In particular, radical crosslinking and radiation crosslinking are suitable.

The radical generator to be used in radical crosslinking is called a radical polymerization initiator and includes organic peroxides, such as hydroperoxides, dialkyl peroxides, diacyl peroxides, peracid esters, and ketone peroxides; inorganic peroxides, such as hydrogen peroxide, persulfates, and metal peroxides; azo compounds; mono- and disulfides; chelates; and redox initiators. Organic peroxides are preferred and, in particular, those having a 1 minute half-life at a temperature of 100° C. or higher, preferably 120° C. or higher, and more preferably 140° C. or higher.

Examples of suitable hydroperoxides are t-butyl hydroperoxide, cumene hydroperoxide, diisopropylbenzene hydroperoxide, p-menthane hydroperoxide, 2,5-dimethylhexane-2,5-dihydroperoxide, and pinane hydroperoxide.

Examples of suitable dialkyl peroxides are di-t-butyl peroxide, t-butylcumyl peroxide, dicumyl peroxide, α,α'-bis(t-butylperoxy)-p-diisopropylbenzene, 2,5-dimethyl-2,5-di(t-butylperoxy)hexane, and 2,5-dimethyl-12,5-di(t-butylperoxy)-hex-3-yne.

Examples of suitable diacyl peroxides are acetyl peroxide, succinic acid peroxide, benzoyl peroxide, and 2,4-dichlorobenzoyl peroxide.

Examples of suitable peracid esters are t-butyl peroxyacetate, t-butyl peroxyisobutyrate, t-butyl peroxy-2-ethylhexanoate, t-butyl peroxy-3,5,5-trimethylhexanoate, t-butyl peroxylaurate, t-butyl peroxybenzoate, di-t-butyl diperoxyphthalate, 2,5-dimethyl-2,5-di(benzoylperoxy)hexane, t-butyl peroxymaleate, and t-butyl peroxyisopropylcarbonate.

Examples of suitable ketone peroxides are methyl ethyl ketone peroxide, cyclohexanone peroxide, and 1,1-bis(t-butylperoxy)-3,5,5-trimethylcyclohexane.

Preferred of these radical generators are organic peroxides, e.g., 2,5-dimethylhexane-2,5-dihydroperoxide, di-t-butyl peroxide, t-butylcumyl peroxide, dicumyl peroxide, α,α'-bis(t-butylperoxy)-p-diisopropylbenzene, 2,5-dimethyl-2,5-di(t-butylperoxy)hexane, 2,5-dimethyl-2,5-di(t-butylperoxy)hex-3-yne, benzoyl peroxide, and t-butyl peroxyisopropylcarbonate.

The radical generator is usually used in an amount of from 0.01 to 15 parts by weight, and preferably from 0.05 to 10 parts by weight, per 100 parts by weight of the composition.

Radical crosslinking can be carried out by any conventional technique, such as a process in which the composition and a radical generator are melt-mixed by heating, a process in which solutions of each component in an appropriate solvent are mixed by heating, followed by solvent removal, and a process in which the molded composition is dipped in a solution of a radical generator with heating the solution followed by solvent removal. In these processes, the crosslinking system is heated at a temperature between 120° and 300° C. for an appropriate time to cause crosslinking. If desired, the heating is continued afterward.

Melt-mixing of the system is effected either in a batch system or in a continuous system by means of, e.g., a twin-cylinder mixer, a Henschel mixer, a mixing roll, a Banbury mixer, a kneading extruder, a kneader, a Brabender plastograph, etc.

Suitable radiation to be used in radiation crosslinking includes γ-rays emitted from $^{60}Co$ or $^{137}Cs$; electron rays emitted from an electron beam accelerator; X-rays emitted from an X-ray generator; ultraviolet rays, proton rays, α-rays, β-rays, neutron, etc. Preferred are γ-rays because of the stable availability of the radiation source due to advancements in the nuclear power industry and electron rays which can be obtained at a high dose relatively cheaply due to technical improvements in accelerators.

The radiation is usually applied at a dose of from 0.01 to 500 Mrad, and preferably from 0.1 to 100 Mrad.

Radiation crosslinking is usually effected at a temperature of from 0° C. to a temperature as high as the melting point or softening point of the copolymer resin or the polymer composition containing the copolymer, and preferably from 15° to 100° C. Temperatures out of this ranges are also employable with no problem. It is a marked characteristic of radiation crosslinking that the crosslinking temperature is not particularly limited.

The atmosphere for crosslinking is also not limited, and the radiation crosslinking may be performed in air, in an inert gas, or in vacuo.

If desired, the radiation crosslinking may be conducted in combination with using an organic peroxide, sulfur or a sulfur compound, or a vulcanization accelerator, etc.

In carrying out the crosslinking by any of the above-described methods, addition of a crosslinking agent is effective to improve the crosslinking efficiency.

Suitable the crosslinking agents include di- or triallyloxy-s-triazines, di- or triallylisocyanuric acids, compounds having two or more acryloyloxy groups or methacryloyloxy groups, and polyallyl esters of polycarboxylic acids. Specific examples of such crosslinking agents are triallyl cyanurate, 2,4-diallyloxy-6-dodecylamino-s-triazine, triallyl isocyanurate, diethylene glycol dimethacrylate, and diallyl phthalate.

The crosslinking agent is usually added in an amount of from 0.01 to 20 parts by weight, and preferably from 0.05 to 10 parts by weight, per 100 parts by weight of the foaming composition.

Foaming conditions to be used in the present invention are either for physical foaming or for chemical foaming.

The foaming agents which can be used include physical foaming agents (pneumatogens), e.g.-, nitrogen, argon, methane, Freon, butane, hexane, and heptane; inorganic chemical foaming agents, e.g., sodium hydrogencarbonate; and organic chemical foaming agents, e.g., N,N'-dinitrosopentamethyenetetramine, azodicarbonamide, diphenylsulfon-3,3'-disulfonyl hydrazide, 4,4'-diphenyldisulfonyl azide, trihydrazinotriazine, p-toluenesulfonyl semicarbazide, barium azodicarboxylate, benzene-1,3-disulfonyl hydrazide, 4,4'-oxybis(benzenesulfonyl) hydrazide, and 5-phenyltetrazole. Preferred among them are organic chemical foaming agents, e.g., azodicarbonamide.

Where a physical foaming agent is used, crosslinking-foaming is usually conducted by dissolving the foaming agent in the molded articles or preforms of the composition, such as pellets, under heat at normal pressure or under pressure, followed by cooling and reheating or pressure release to obtain a foam. Where a chemical foaming agent having a relatively low decomposition point (e.g., sodium hydrogencarbonate) is used, crosslinking-foaming is usually carried out by heating the composition under pressure to a temperature around the melting point or softening point of the resin or the polymer composition or higher temperatures to cause foaming simultaneously with crosslinking.

Where a chemical foaming agent having a relatively high decomposition point (e.g., a high-temperature decomposing organic chemical foaming agent, e.g., azodicarbonamide) is used, the composition is heated under normal pressure or under pressure at a temperature of from 120° to 300° C., and preferably from 140° to 270° C., to cause foaming simultaneously or after crosslinking. Where crosslinking precedes foaming, the crosslinking temperature should be set below the decomposition point of the foaming agent.

The chemical foaming agent is used in an amount of from 0.05 to 50 parts by weight, preferably from 0.1 to 30 parts by weight, and more preferably from 1 to 20 parts by weight, per 100 parts by weight of the foaming resin composition.

The pressure and atmosphere for foaming are arbitrary. That is, foaming may be conducted in vacuo, at normal pressure, or under pressure and in air or an inert gas, e.g., nitrogen, argon, and helium.

Having generally described this invention, a further understanding can be obtained by reference to certain specific examples which are provided herein for purposes of illustration only and are not intended to be limiting unless otherwise specified.

REFERENCE EXAMPLE 1

Preparation of Catalyst-on-Carrier

In a flask in which the atmosphere had been thoroughly displaced with nitrogen were charged 100 ml of water- and oxygen-free n-heptane and then 0.1 mol of $MgCl_2$ and 0.20 mol of titanium tetra-n-butoxide, and the mixture was allowed to react at 100° C. for 2 hours. After the reaction, the temperature was decreased to 40° C., and 15 ml of methylhydrogenpolysiloxane was added thereto, followed by allowing the mixture to react for 3 hours. After completion of the reaction, the solid product formed was washed with n-heptane. Elemental analysis on an aliquot of the product revealed 15.2% by weight of Ti and 4.2% by weight of Mg.

In a flask in which the atmosphere had been thoroughly displaced with nitrogen were charged 100 ml of water- and oxygen-free n-heptane and then 0.03 mol (based on Mg) of the above-obtained product was added. To the mixture was introduced 0.05 mol of $SiCl_4$ at 30° C. over 15 minutes, followed by allowing the mixture to react at 90° C. for 2 hours. After completion of the reaction, the reaction mixture was washed with purified n-heptane, and a mixture of 25 ml of n-heptane and 0.004 mol of phthaloyl chloride (ortho-$C_6H_4(COCl)_2$) was added thereto at 50° C. To the mixture was further introduced 0.05 mol of silicon tetrachloride ($SiCl_4$), followed by allowing the mixture to react at 90° C. for 2 hours. After completion of the reaction, the reaction product was washed with n-heptane to prepare a catalyst containing 2.05% by weight of Ti.

REFERENCE EXAMPLE 2

Preparation of Copolymer A

A 1 l autoclave was filled with propylene, and 330 ml of n-heptane was charged therein. In the flask were charged 0.1 g of triethylaluminum, 0.04 g of diphenyldimethoxysilane, and 0.08 g of the catalyst prepared in Reference Example 1 in the order described. To the mixture was added 125 Nml of hydrogen, propylene introduced under a pressure of 0.5 kg/cm$^2$G, and the mixture was stirred at 50° C. and 0.5 kg/cm$^2$G for 15 minutes. Thereafter, 60 ml of 7-methyl-1,6-octadiene was added to the reaction mixture, and propylene containing 1.2% by weight of ethylene was introduced therein. The reaction system was kept at a temperature of 60° C. under a pressure of 5.5 kg/cm$^2$G for 5 hours to conduct polymerization. After inactivating the catalyst by n-butanol, the residual catalyst was extracted with water. The mixture was centrifuged, and the solid was dried to obtain 182 g of a powdery copolymer and 9.3 g of an amorphous polymer. The resulting copolymer powder was designated copolymer A.

Copolymer A had a bulk density of 0.45 g/cc, a melt flow rate of 2.8 g/10 min and a melting point (DSC) of 131° C. Copolymer A contained 2.4 mol % of 7-methyl-1,6-octadiene units and 1.9 mol % of ethylene units, the remainder being propylene units. The diene monomer unit was observed to have a 1,2-addition structure and have no chain structure. X-Ray diffractometry of copolymer A revealed a degree of crystallinity of 28.8%. The flexural modulus of copolymer A was 4700 kg/cm$^2$ as measured according to JIS K-7203.

REFERENCE EXAMPLE 3

Preparation of Copolymer B

In the same manner as in Reference Example 2, except for changing the amount of 7-methyl-1,6-octadiene to 120 ml and changing the ethylene content in the propylene charged to 0.6% by weight, a powder of copolymer B having a melt flow rate of 3.1 g/10 min, a melting point (DSC) of 130° C., and a bulk density of 0.40 g/cc was obtained. Copolymer B contained 4.3 mol % of 7-methyl-1,6-octadiene units and 0.9 mol % of ethylene units, the diene monomer unit having a 1,2-addition structure and no chain structure. The degree of crystallinity (determined by X-ray diffractometry) was 26.5%, and the flexural modulus (JIS K-7203) was 4100 kg/cm$^2$.

REFERENCE EXAMPLE 4

Preparation of Copolymer C

In the same manner as in Reference Example 2, except for replacing 7-methyl-1,6-octadiene with 60 ml of 6-methyl-1,5-heptadiene, a powder of copolymer C having a melt flow rate of 2.2 g/10 min, a melting point (DSC) of 133° C., and a bulk density of 0.44 g/cc was obtained. Copolymer C contained 2.2 mol % of 6-methyl-1,5-heptadiene units and 2.0 mol % of ethylene units, the diene monomer unit having a 1,2-addition structure and no chain structure. The degree of crystallinity (determined by X-ray diffractometry) was 30.0%, and the flexural modulus (JIS K-7203) was 5000 kg/cm$^2$.

EXAMPLES 1 TO 4

Copolymer A prepared in Reference Example 2 and a propylene-ethylene (4.2% by weight) random copolymer "Mitsubishi POLYPRO FX4C" produced by Mitsubishi Petrochemical Co., Ltd. were mixed at the mixing ratio shown in Table 1 below. The mixed resin was compounded with 15 parts by weight of azodicarbonamide and 0.05 part by weight of IRGANOX ® 1010 per 100 parts by weight of the mixed resin, and the compound was extruded from an extruder fitted with a coathanger die 300 mm wide at 145° C. to obtain a 2 mm thick sheet. The sheet was irradiated with electron rays emitted from an electron beam accelerator at the dose shown in Table 1. The irradiated sheet was then passed through a molten salt bath at 220° C. for a retention time of 2 minutes and 15 seconds to obtain a crosslinked foam. The physical properties of the resulting foam are shown in Table 1.

Cello-tape was adhered to the foam to conduct a peel test. On pulling the tape, the tape was not peeled off the foam at the interface, and the foam itself was broken, proving high adhesion between the tape and the foam.

COMPARATIVE EXAMPLE 1

A resin sheet was prepared and irradiated with electron rays in the same manner as in Example 3, except for using Mitsubishi POLYPRO FX4C alone. The gel content was 0%, and a foam was not obtained in a molten salt bath.

COMPARATIVE EXAMPLES 2 AND 3

A resin sheet was prepared and irradiated with electron rays in the same manner as in Example 2, except for replacing copolymer A with a propylene-methyl-1,4-hexadiene copolymer (methyl-1,4-hexadiene content: 3.8 mol %; melting point: 153.1° C.; melt flow rate: 2.2 g/10 min). The physical properties of the resulting foams are shown in Table 1.

EXAMPLES 5 AND 6

A crosslinked foam was obtained in the same manner as in Example 1, except for replacing copolymer A with copolymer B prepared in Reference Example 3 (Example 5) or copolymer C prepared in Reference Example 4 (Example 6). The physical properties of the resulting foams are shown in Table 1.

EXAMPLE 7

In the same manner as in Reference Example 3, except for changing the ethylene content in the propylene charged to 0% by weight, copolymer D having a melt flow rate of 3.7 g/10 min, and a melting point (DSC) of 149° C. was obtained. Copolymer D contained 4.2 mol % of 7-methyl-1,6-octadiene units.

A foam was obtained in the same manner as in Example 5, except for replacing copolymer B with copolymer D. The physical properties of the resulting foam are shown in Table 2.

EXAMPLE 8

A foam was obtained in the same manner as in Example 3, except for replacing "Mitsubishi POLYPRO FX4C" with "Mitsubishi POLYPRO FX3B" (melting point: 149° C.). The physical properties of the resulting foam are shown in Table 2.

COMPARATIVE EXAMPLE 4

In the same manner as in Reference Example 2, except for adding no hydrogen, copolymer E having a melt flow rate of 0.1 g/10 min, and a melting point (DSC) of 131° C. was obtained. Copolymer E contained 2.4 mol % of 7-methyl-1,6-octadiene units and 1.9 mol % of ethylene units.

A foam was obtained in the same manner as in Example 4, except for replacing copolymer A with copolymer E. The physical properties of the resulting foam are shown in Table 2.

COMPARATIVE EXAMPLE 5

In the same manner as in Reference Example 2, except for changing the amount of hydrogen added to 7.0 Nl, and changing the polymerization pressure to 6.5 kg/cm$^2$G, copolymer F having a melt flow rate of 400 g/10 min, and a melting point (DSC) of 132° C. was obtained. Copolymer F contained 2.5 mol % of 7-methyl-1,6-octadiene units and 1.8 mol % of ethylene units.

A foam was obtained in the same manner as in Example 4, except for replacing copolymer A with copolymer F. The physical properties of the resulting foam are shown in Table 2.

COMPARATIVE EXAMPLE 6

A foam was obtained in the same manner as in Example 2, except for replacing "Mitsubishi POLYPRO

TABLE 1

| Resin | MP (°C.) | MFR (g/10 min) | Example 1 | Example 2 | Example 3 | Example 4 | Comparative Example 1 | Comparative Example 2 | Comparative Example 3 | Example 5 | Example 6 |
|---|---|---|---|---|---|---|---|---|---|---|---|
| Resin Composition (part by weight): | | | | | | | | | | | |
| Copolymer A | 131.0 | 2.8 | 90 | 60 | 40 | 20 | 0 | 0 | 0 | 0 | 0 |
| Copolymer B | 130.0 | 3.1 | 0 | 0 | 0 | 0 | 0 | 0 | 0 | 60 | 0 |
| Copolymer C | 133 | 2.2 | 0 | 0 | 0 | 0 | 0 | 0 | 0 | 0 | 90 |
| POLYPRO FX4C | 138.0 | 6.0 | 10 | 40 | 60 | 80 | 100 | 40 | 40 | 40 | 10 |
| 1,4-Diene copolymer* | 153.1 | 2.2 | 0 | 0 | 0 | 0 | 0 | 60 | 60 | 0 | 0 |
| Electron Ray Radiation Dose (Mrad) | | | 1 | 1 | 3 | 3 | 3 | 3 | 5 | 1 | 1 |
| Gel Content (wt %)** | | | 46.3 | 41.1 | 55.5 | 44.2 | 0 | 33.3 | 47.1 | 57.5 | 42.4 |
| Physical Properties of Foam: | | | | | | | | | | | |
| Apparent specific gravity (g/ml) | | | 0.043 | 0.038 | 0.041 | 0.037 | *** | 0.070 | 0.048 | 0.041 | 0.043 |
| Tensile strength (kg/cm$^2$) | | | 14.7 | 13.8 | 14.0 | 13.2 | — | **** | 10.1 | 13.2 | 14.8 |
| Tensile elongation (%) | | | 420 | 420 | 430 | 430 | — | — | 430 | 470 | 400 |
| Hardness in 25% Compression (kg/cm$^2$) | | | 1.7 | 1.2 | 1.3 | 1.2 | — | — | 0.9 | 1.3 | 1.6 |
| Closed cell size distribution | | | uniform | uniform | uniform | uniform | — | non-uniform | slightly non-uniform | uniform | uniform |

Note:
*Propylene-methyl-1,4-hexadiene copolymer described in Comparative Examples 2 and 3.
**Boiling xylene-insoluble content.
***Unmeasureable because no foaming occurred.
****Measurements were not made because foaming was insufficient.

FX4C" with "POLYPRO PY 230" (melting point: 162° C.). The physical properties of the resulting foam are shown in Table 2.

COMPARATIVE EXAMPLE 7

In the same manner as in Reference Example 2, except for changing the amount of 7-methyl-1,6-octadiene added to 25 ml, copolymer G having a melt flow rate of 2.2 g/10 min, and a melting point (DSC) of 141° C. was obtained. Copolymer G contained 1.0 mol % of 7-methyl-1,6-octadiene units and 1.9 mol % of ethylene units.

A foam was obtained in the same manner as in Example 4, except for replacing copolymer A with 0.7% by weight of copolymer G and changing the amount of "Mitsubishi POLYPRO FX4C" to 99.3% by weight. The physical properties of the resulting foam are shown in Table 2.

TABLE 2

| Resin | MP (°C.) | MFR (g/10 min) | Example 7 | Example 8 | Comparative Example 4 | Comparative Example 5 | Comparative Example 6 | Comparative Example 7 |
|---|---|---|---|---|---|---|---|---|
| Resin Composition (part by weight): | | | | | | | | |
| Copolymer A | 131.0 | 2.8 | 0 | 40 | 0 | 0 | 60 | 0 |
| Copolymer D | 149 | 3.7 | 60 | 0 | 0 | 0 | 0 | 0 |
| Copolymer G | 141 | 2.2 | 0 | 0 | 0 | 0 | 0 | 0.7 |
| POLYPRO PY230 | 162 | 1.7 | 0 | 0 | 0 | 0 | 40 | 0 |
| POLYPRO FX4C | 138.0 | 6.0 | 40 | 0 | 80 | 80 | 0 | 99.3 |
| POLYPRO FX3B | 149 | 10.0 | 0 | 60 | 0 | 0 | 0 | 0 |
| Copolymer E | 131 | 0.1 | 0 | 0 | 20 | 0 | 0 | 0 |
| Copolymer F | 132 | 400 | 0 | 0 | 0 | 20 | 0 | 0 |
| Electron Ray Radiation Dose (Mrad) | | | 1 | 3 | 3 | 3 | 1 | 3 |
| Gel Content (wt %)** | | | 54.3 | 52.5 | 44.4 | 38.2 | 40.1 | 3.0 |
| Physical Properties of Foam: | | | | | | | | |
| Apparent specific gravity (g/ml) | | | 0.037 | 0.039 | *** | 0.08 | 0.08 | *** |
| Tensile strength (kg/cm$^2$) | | | 14.0 | 13.5 | — | **** | **** | — |
| Tensile elongation (%) | | | 390 | 410 | — | — | — | — |
| Hardness in 25% Compression (kg/cm$^2$) | | | 1.4 | 1.3 | — | — | — | — |
| Closed cell size distribution | | | uniform | uniform | — | extremely coarse, non-uniform | extremely coarse, non-uniform | — |

Note:
**Boiling xylene-insoluble content.
***Unmeasurable because no foaming occurred.
****Measurements were not made because foaming was insufficient.

Obviously, numerous modifications and variations of the present invention are possible in light of the above teachings. It is therefore to be understood that, within the scope of the appended claims, the invention may be practiced otherwise than as specifically described herein.

What is claimed as new and desired to be secured by Letters Patent of the United States is:

1. A process for producing a foam, comprising subjecting a foaming composition to foaming with crosslinking, said foaming composition comprising (A) from 1 to 99% by weight, based on the total weight of (A) and (B), of a random copolymer comprising units derived from propylene, from 0.1 to 15 mol % of units derived from a non-conjugated diene represented by formula (I):

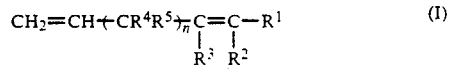

wherein R$^1$, R$^2$, R$^3$, R$^4$, and R$^5$ each independently represents a hydrogen atom or an alkyl group having from 1 to 8 carbon atoms; and n represents a number of from 2 to 10, and 0 to 4 mol % of units derived from ethylene, said random copolymer having a degree of crystallinity of at least 20% as measured by X-ray diffractometry, a melt flow rate of from 0.01 to 200 g/10 min as measured according to ASTM D1238-1986, and an elastic modulus of from 1,000 to 15,000 kg/cm$^2$ as measured according to ASTM D790M-86 and (B) from 99 to 1% by weight, based on the total weight of (A) and (B), of a homopolymer of an α-olefin having from 3 to 12 carbon atoms or a copolymer mainly comprising said α-olefin, wherein the melting point of the minor resin component (A) or (B) is less than 15° C. higher than that of the major resin component (A) or (B), and the ratio of the melt flow rate of resin component (A) to that of (B) is between 0.02 and 50.

2. The process of claim 1, wherein said non-conjugated diene is selected from the group consisting of 6-methyl-1,5-heptadiene, 6-methyl-1,5-octadiene, 6-methyl-1,6-octadiene, 7-methyl-1,6-octadiene, 7-ethyl-1,6-octadiene, and 8-methyl1,7-nonadiene.

3. The process of claim 1, wherein the weight ratio of resin (A) to resin (B) ranges from 10:90 to 90:10.

4. The process of claim 1, wherein the ratio of the melt flow rate of resin component (A) to that of (B) is between 0.1 and 10.

5. A foam, produced by a process, comprising subjecting a foaming composition to foaming with crosslinking, said foaming composition comprising (A) from 1 to 99% by weight, based on the total weight of (A) and (B), of a random copolymer comprising units derived from propylene, from 0.1 to 15 mol % of units derived from a non-conjugated diene represented by formula (I):

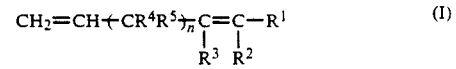

wherein R$^1$, R$^2$, R$^3$, R$^4$, and R$^5$ each independently represents a hydrogen atom or an alkyl group having from 1 to 8 carbon atoms; and n represents a number of from 2 to 10, and 0 to 4 mol % of units derived from ethylene, said random copolymer having a degree of crystallinity of at least 20% as measured by X-ray diffractometry, a melt flow rate of from 0.01 to 200 g/10 min as measured according to ASTM D1238-1986, and an elastic modulus of from 1,000 to 15,000 kg/cm$^2$ as measured according to ASTM D790M-86, and (B) from 99 to 1% by weight, based on the total weight of (A) and (B), of a homopolymer of an α-olefin having from 3 to 12 carbon atoms or a copolymer mainly comprising said α-olefin, wherein the melting point of the minor resin component (A) or (B) is less than 15° C. higher than that of the major resin component (A) or (B), and the ratio of the melt flow rate of resin component (A) to that of (B) is between 0.02 and 50.

6. The foam of claim 5, wherein said non-conjugated diene is selected from the group consisting of 6-methyl-1,5-heptadiene, 6-methyl-1,5-octadiene, 6-methyl-1,6-octadiene, 7-methyl-1,6-octadiene, 7-ethyl-1,6-octadiene, and 8-methyl-1,7-nonadiene.

7. The foam of claim 5, wherein the weight ratio of resin (A) to resin (B) ranges from 10:90 to 90:10.

8. The foam of claim 5, wherein the ratio of the melt flow rate of resin component (A) to that of (B) is between 0.1 and 10.

9. The process of claim 1, wherein said crosslinking is selected form the group consisting of radical crosslinking, crosslinking using sulfur or a sulfur compound, radiation crosslinking, resin crosslinking and quinoid crosslinking.

10. The process of claim 1, wherein said crosslinking is radical crosslinking or radiation crosslinking.

11. The process of claim 9, wherein said crosslinking is carried out in the presence of a foaming agent.

12. The process of claim 10, wherein said crosslinking is carried out in the presence of a foaming agent.

13. The process of claim 12, wherein said foaming agent is an organic chemical foaming agent.

* * * * *